United States Patent [19]
Ito et al.

[11] 4,048,811
[45] Sept. 20, 1977

[54] COMBINATION OF AIR CONDITIONER AND VENTILATING UNIT PROVIDED WITH TOTAL HEAT EXCHANGER ASSEMBLY

[75] Inventors: Tadashi Ito, Nara; Katuhiro Wakahara, Tenri; Masao Tatsuoka, Nara, all of Japan

[73] Assignee: Sharp Kabushiki Kaisha, Osaka, Japan

[21] Appl. No.: 670,103

[22] Filed: Mar. 25, 1976

[30] Foreign Application Priority Data

| Mar. 28, 1975 | Japan | 50-38844 |
| Mar. 28, 1975 | Japan | 50-38845 |
| Mar. 28, 1975 | Japan | 50-38848 |
| June 9, 1975 | Japan | 50-69837 |

[51] Int. Cl.² ............ F25D 23/12; F25D 17/06; F24F 13/00
[52] U.S. Cl. ............ 62/263; 62/411; 62/412; 98/33 R; 165/DIG. 12
[58] Field of Search ........... 62/412, 411, 263; 98/32, 33 A; 165/39, DIG. 12

[56] References Cited

U.S. PATENT DOCUMENTS

| 1,928,331 | 9/1933 | Downs | 62/411 |
| 2,118,949 | 5/1938 | Scott | 62/412 |
| 2,206,858 | 7/1940 | McKee | 165/DIG. 12 |
| 3,173,275 | 3/1965 | Urian | 62/412 |
| 3,324,782 | 6/1967 | Norris et al. | 98/33 R |
| 3,417,577 | 12/1968 | Waldron | 62/411 |
| 3,504,617 | 4/1970 | Merklin et al. | 98/33 R |
| 3,659,432 | 5/1972 | Selhost | 62/412 |
| 3,831,395 | 8/1974 | Leny | 62/263 |

*Primary Examiner*—Lloyd L. King
*Attorney, Agent, or Firm*—Birch, Stewart, Kolasch & Birch

[57] ABSTRACT

An air ventilating unit provided with a rotary heat exchanger assembly communicating between an incoming air passage and an outgoing air passage for heat recovery in air conditioning. The ventilating unit is adopted to enable direct deposition on the upper wall of an air conditioner. When the ventilating unit is mounted on the air conditioning unit, the outside air (fresh air) outlet formed in the front wall of the ventilating unit is positioned closely adjacent to the air outlet of the air conditioning unit. Room air inlets are formed on both side walls of the ventilating unit.

11 Claims, 12 Drawing Figures

COMBINATION OF AIR CONDITIONER AND VENTILATING UNIT PROVIDED WITH TOTAL HEAT EXCHANGER ASSEMBLY

BACKGROUND OF THE PRIOR ART

The present invention relates to combination of an air conditioning unit with an air ventilating unit for heat recovery.

Generally, the prior art ventilating units provided with a rotary total heat exchanger assembly were placed in a room to be air-conditioned as independent floor type units separate from the air conditioning units. Because the prior art units were of the floor type design, an area was required for placement of the ventilating units, if the units were not positioned properly. In some cases there was the possibility of occurring intereference between a stream of air derived from the ventilating unit and a stream of air derived from the air conditioning unit. Thus, the obtained airflow and air conditioning state were not satisfactory.

BRIEF SUMMARY OF THE INVENTION

Accordingly, it is an object of the present invention to provide an improved combination of ventilators and air conditioners which require no additional area for placement of the ventilators and provide satisfactory air circulation suitable for air conditioning.

In other words, in accordance with the concept of the present invention the ventilators are not free from the air conditioners and utilize the general nature of the processing airflow from the air conditioners which is 10 times as great as that of the ventilators.

BRIEF DESCRIPTION OF THE DRAWINGS

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention will be readily appreciated as the same becomes better understood by reference to the following detailed description which considered in conjunction with the accompanying drawings in which like reference numerals designate like parts throughout the figures thereof, and wherein.

DETAILED DESCRIPTION OF THE INVENTION

Referring now to FIGS. 1 through 5, there is illustrated a combination of an air conditioner 21 and a ventilator unit 2 provided with a rotary type total heat exchanger assembly, constructed in accordance with the present invention. Outside air (fresh air) 1 derived from the ambient atmosphere passes through an inlet 3, a filter 4 to half of the rotary type total heat exchanger 6 driven by a driving motor 5. The rotary type total heat exchanger 6 comprises a rotary drum for accommodating a heat regenerative member having heat storage properties, preferably, constructed from honeycomb structured asbestos. See, for example, U.S. Pat. No. 1,746,598 issued to Fredrik Ljungström.

Heat exchange is carried out through the heat exchanger assembly 6 so that the temperature and humidity of the supplied air 7 is substantially equal to room air. The supplied air 7 enters into a room to be ventilated via a duct 10, louvers 11 and a supply air outlet 12 through the operation of a supply air fan 9 driven by a motor 8.

Room air 14a to be exhausted or discharged is induced via an inlet 13a. This exhaust room air flows toward the front of the rotary type total heat exchanger assembly 6 past the motor 8 thereby cooling the motor. Simultaneously, room air 14b induced via the inlet 13b flows toward the front of the rotary type total heat exchanger assembly 6 through a filter 15b past an air discharging motor 16 and the heat exchanger driving motor 5 thereby cooling the motors. These streams of room air are combined within the ventilator housing. The combined room air 14a and 14b passes through the rotary type total heat exchanger assembly 6 to perform heat transmission or exchanger. This results in the generation of exhaust air 17 which is substantially equal to the temperature and humidity of the ambient air. The exhaust air 17 is discharged to the ambient atmosphere via a duct 19 and an outlet 20 through the use of an air exhausting or discharging fan 18 driven by a motor 16.

Figure 1:
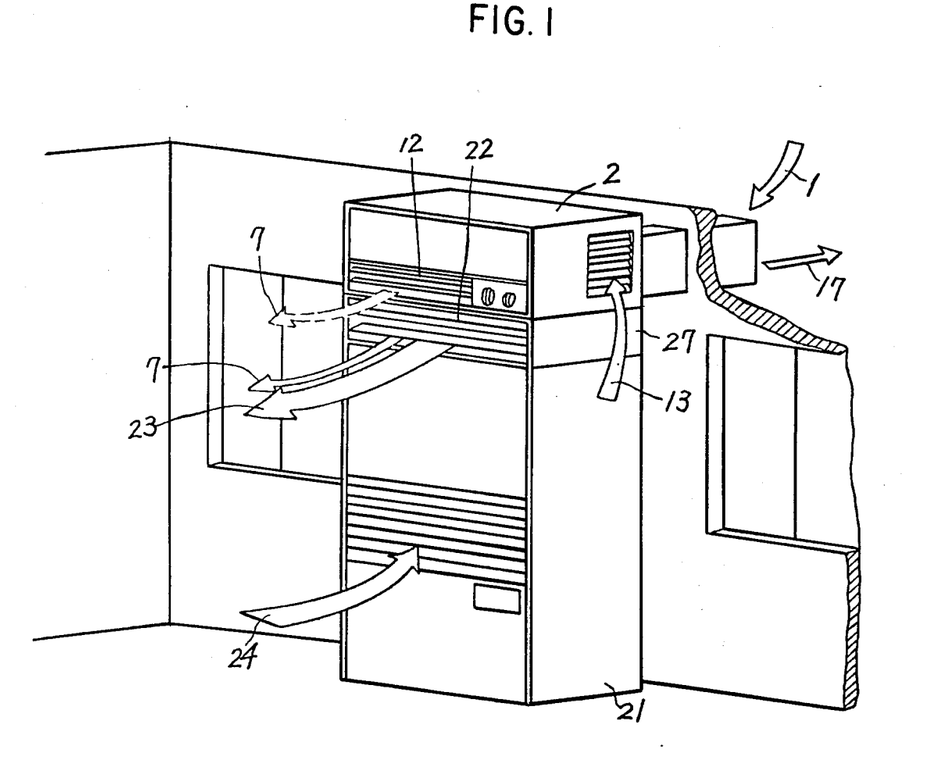
FIG. 1 is a perspective view of the combination of an improved ventilator with an air conditioner embodying the present invention in one preferred form.
Figure 2:
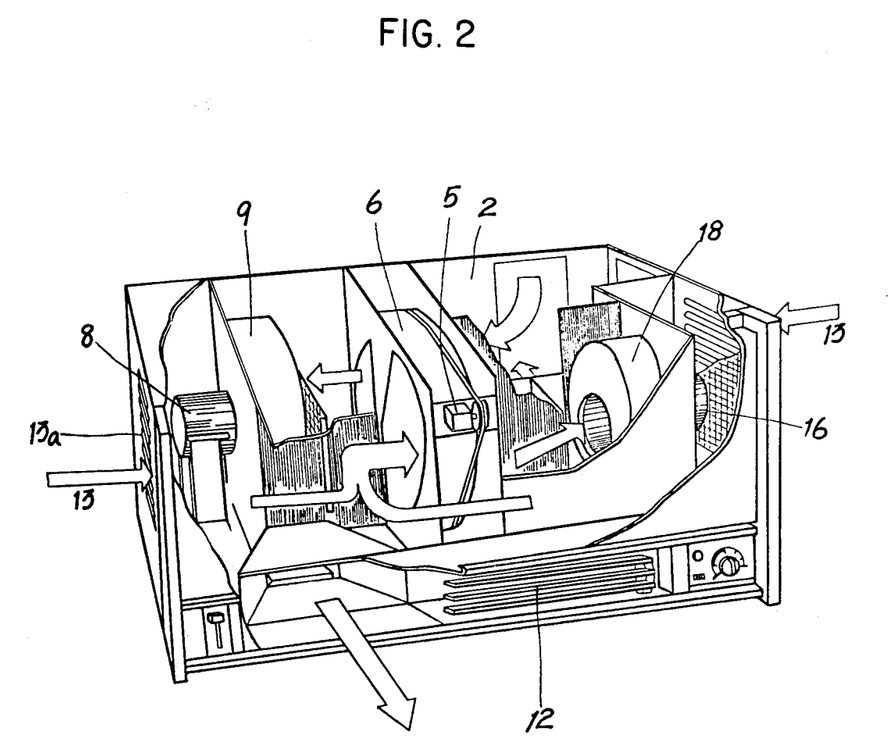
FIG. 2 is a partial sectional view of the improved ventilator illustrated in FIG. 1.
Figure 3:
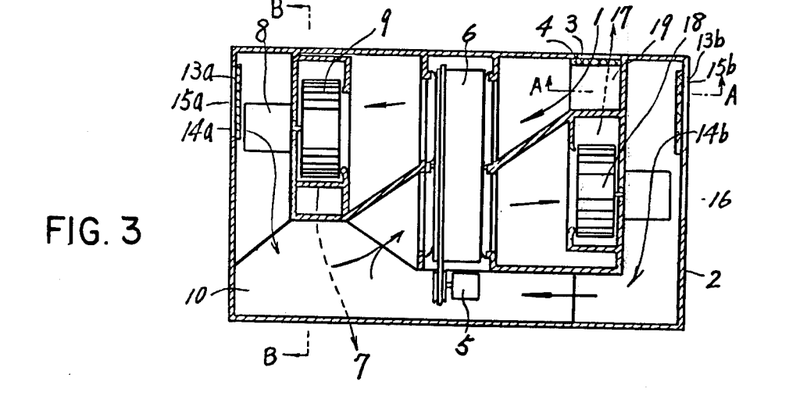
FIG. 3 is a cross-sectional view of the improved ventilator illustrated in FIG. 2.
Figure 4:
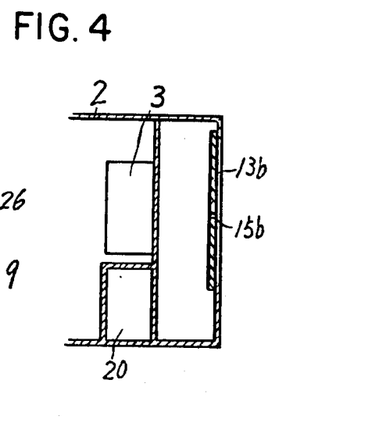
FIG. 4 is a cross-sectional view taken along line A—A of FIG. 3.

The ventilator unit 2 as discussed above may be mounted on the air conditioner 21 without requiring additional floor area for placement of the ventilator unit 2. In addition, the outlet 12 of the ventilator unit 2 is positioned closely adjacent to the outlet 22 of the air conditioner 21 when the ventilator unit 2 is mounted on the air conditioner 21. With such an arrangement, the supplied air 7 from the ventilator unit 2 is intermixed and combined into the supplied air 23 from the air conditioner 21 immediately after existing from the outlet because the quantity of flow of the supplied air 23 from the air conditioner 21 is about ten times as great as that from the ventilator unit 2.

By formation of the exhaust air inlets 13a and 13b on both side walls of the ventilator unit 2, a portion of air 24 to be returned to the air conditioner 21 enters into the ventilator unit 2 as room air 14a and 14b to be exhausted or discharged. Therefore, satisfactory air circulation may be attained without short circuit in the ventilating unit 2.

Figure 5:
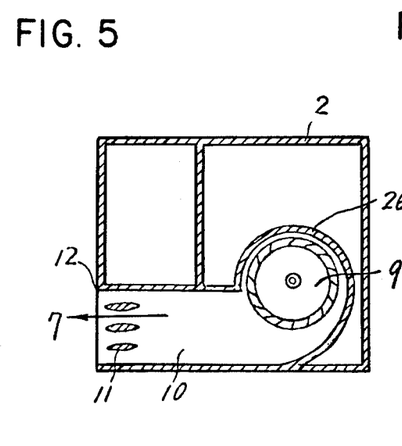
FIG. 5 is a cross-sectional view taken along line B—B of FIG. 3.
Figure 6:
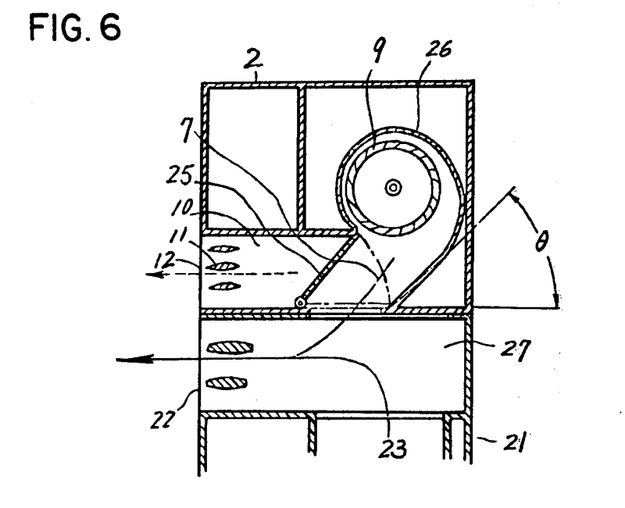
FIG. 6 is a partial cross-sectional view of a ventilator-air conditioner combination of the present invention in another preferred form.

Another embodiment of the present invention is illustrated in FIG. 6 wherein the supplied air duct 10 of FIG. 5 is separated by means of a damper 25 and a supplied air fan casing 26 is inclined with respect to the supplied air duct 10. When the air conditioner 21 is in operation, the supplied air 7 is guided from the outlet 12 to a chamber 27 in the air conditioner by switching the damper 25. Thus, the supplied air 7 is fully mixed with the supplied air 23 from the air conditioner 21 in the chamber 27 and the mixture of the supplied air flows via the outlet 22 of the air conditioner 21.

In addition, if the air conditioner 21 is not in operation and the supplied air 7 from the ventilator unit 2 is blowed out via the outlet 22 of the air conditioner 21 the supplied air 7 from the ventilator unit 2 may not uniformly distribute throughout the room since the quantity of flow of the supplied air 7 from the ventilator unit 2 is considerably small when compared with that from the air conditioner 21 (for example, one-tenth). However, in accordance with the embodiment of FIG. 6, the supplied air may be blowed out via the outlet 12 of the ventilator unit 2 due to the switching of the damper 25 to thereby ensure uniform distribution of ventilating air circulation.

The difference in the air flow resistance toward the outlets 12 and 22, due to the switching of the damper 25 can be canceled by inclining the fan casing 26 at an angle of 30°–60°.

Figure 7:
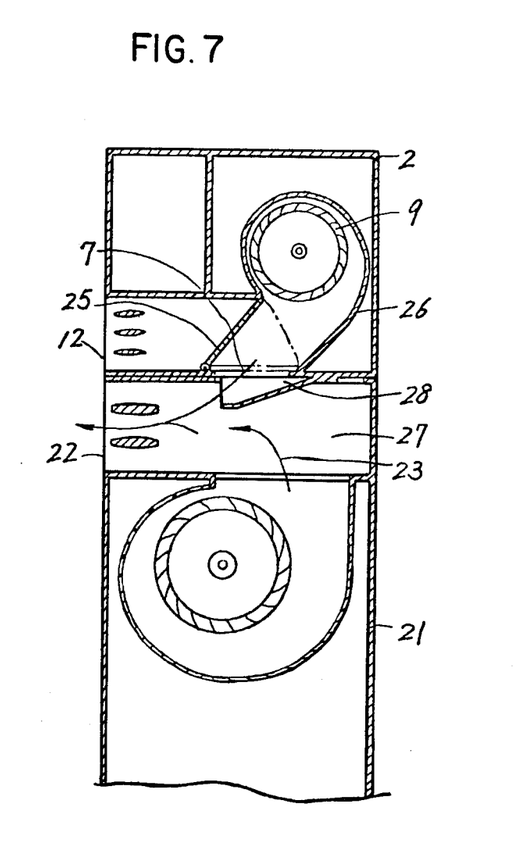
FIG. 7 is a cross-sectional view of an improvement in the combination illustrated in FIG. 6.

FIG. 7 illustrates a guide plate 28 provided at the outlet 12 of the ventilator unit 2. By utilization of the guide plate 28, the supplied air 7 from the ventilator unit 2 can smoothly flow toward the outlet 22 in the chamber 27. At the same time the supplied air from the air conditioner 21 flows below the guide plate 28 and advances toward the outlet 22. Both of the supplied air streams are combined adjacent the outlet 22 of the air conditioner 21. A perspective view of the guide member 28 is illustrated in FIG. 8.

Figure 10:
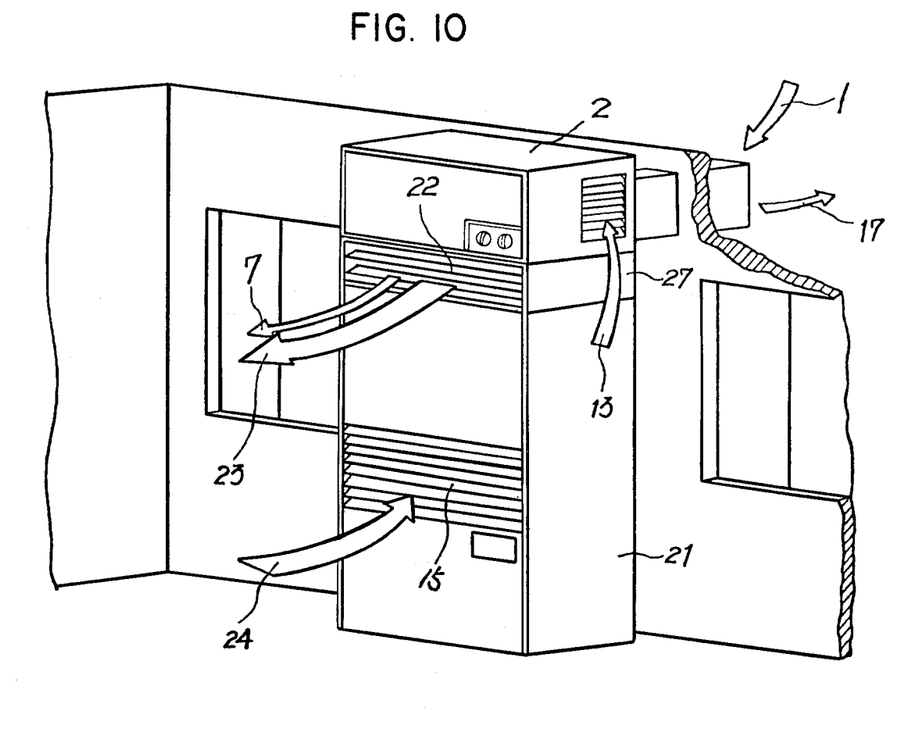
FIG. 10 is a perspective view of a ventilator-air conditioner combination of the present invention in still another preferred form.

Still another embodiment of the invention is illustrated in FIG. 10, wherein the ventilator unit 2 is not provided with an outlet 12, thus the supplied air from the ventilator unit 2 is sent out directly from the outlet 22 of the air conditioner 21.

Figure 11:
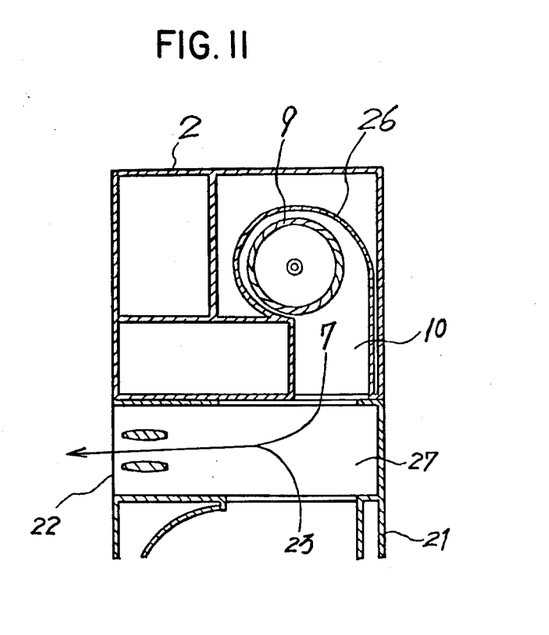
FIG. 11 is a partial cross-sectional view of the combination illustrated in FIG. 10.

In the ventilator unit 2, the supplied air 7 is sent via the duct 10 to the chamber 27 of the air conditioner 21 through the operation of the supply air fan 9 driven by the motor 8 and, subsequently, is mixed with the supplied air 23 of the air conditioner 21. The mixture is blowed out via the outlet 22 of the air conditioner 21.

Figure 8:
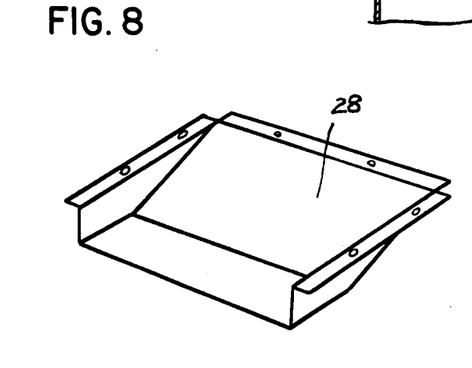
FIG. 8 is a perspective view of a guide member used in the improvement of FIG. 7.
Figure 9:
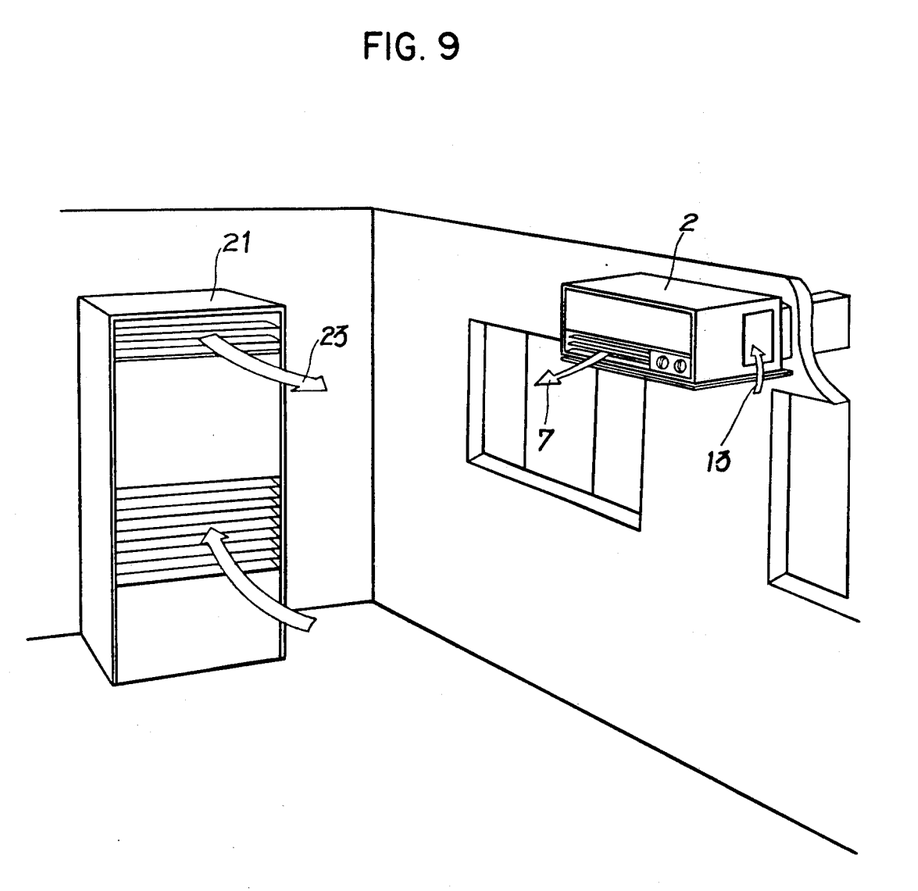
FIG. 9 is a perspective view of another placement of the ventilator-air conditioner combination illustrated in FIG. 6.
Figure 12:
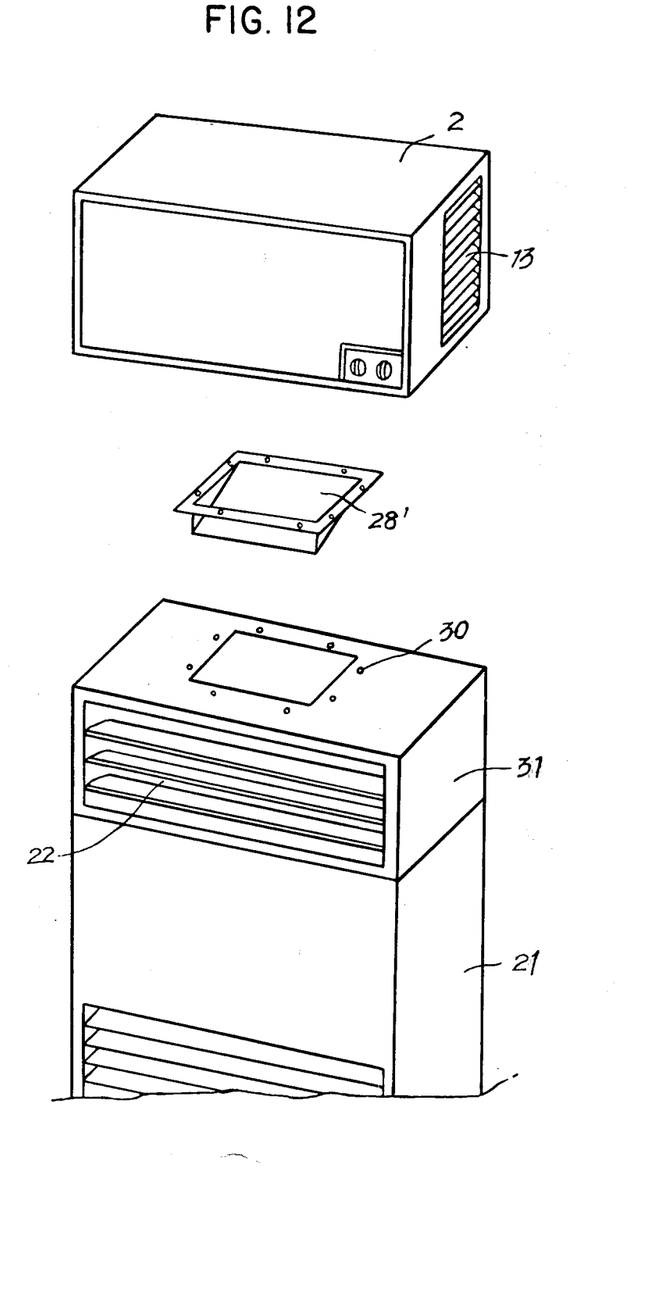
FIG. 12 is an exploded perspective view of a ventilator-air conditioner combination of the present invention showing a modification in the guide member of FIG. 8.

Modification in the guide member 28 of FIG. 8 is illustrated in FIG. 12. A duct connection cover (not shown) is removed from the top wall of the air conditioner 21 and a guide plate 28' is secured on the air conditioner 21 through the use of duct installation holes 30. The supplied air 7 from the ventilator unit 2 is sent to the plenum 31 of the air conditioner 21 and then blowed out along the guide plate 28 toward the outlet 22. At the same time the supplied air 23 of the air conditioner 21 flows smoothly along the guide plate 28. Both of the supply air streams are mixed adjacent the outlet 22.

In the above discussed embodiments all the respective motors are cooled by means of room air which has been utilized for the purpose of air conditioning and is to be exhausted or discharged to the ambient atmosphere. This cooling prevents the motors from over-heating. A throttle scheme may be provided at the entrance port in the total heat exchanger assembly to throttle the exhausted room air to provide a proper negative pressure thereby effectively preventing leakage of the exhaust air to the supplied air side.

It is to be understood that the air conditioner shown in these drawings may be either package air conditioners or oil furnaces or gas furnaces.

While only certain embodiments of the present invention have been described, it will be apparent to those skilled in the art that various changes and modifications may be made therein without departing from the spirit and scope of the invention, and all such modifications as would be obvious to one skilled in the art are intended to be included within the scope of the following claims.

What is claimed is:

1. A combination air conditioner and ventilator comprising:

an air conditioner unit including an air inlet and a supplied air outlet;

a ventilator unit mounted adjacent the air conditioner unit and provided with a total heat exchanger assembly for recovering heat from an air exhaust flow from the air conditioner unit;

said ventilator unit including first and second supplied air outlets;

said first ventilator supplied air outlet being separate from the supplied air outlet of the air conditioner unit;

said second ventilator supplied air outlet communicating with the interior of the air conditioner unit; and a damper means operatively provided within the interior of the ventilator unit for directing the ventilator supplied air flow between said first ventilator supplied air outlet and said second ventilator supplied air outlet.

2. A combination as defined in claim 1 wherein the ventilator unit is mountable on and removable from the air conditioner unit.

3. A combination air conditioner and ventilator comprising:

an air conditioner unit including an air inlet and a supplied air outlet;

a ventilator unit mounted adjacent the air conditioner unit and including a rotary type total heat exchanger assembly for recovering heat from an air exhaust flow from the air conditioner unit;

said ventilator unit including first and second supplied air outlets;

said first ventilator supplied air outlet being positioned adjacent to the air conditioner supplied air outlet;

said second ventilator supplied air outlet communicating with the interior of the air conditioner unit; and a damper means operatively provided within the interior of the ventilator unit for directing the ventilator supplied air flow between said first ventilator supplied air outlet and said second ventilator supplied air outlet.

4. A combination as defined in claim 3, wherein a duct communicates with the ventilator unit dividing the supplied air flow into two sections one communicating with the supplied air outlet of the ventilator unit and the other communicating with the supplied air outlet of the air conditioner unit.

5. A combination as defined in claim 4, wherein said damper is provided at the division point of the duct for switching the orientation of the supplied air from the ventilator unit.

6. A combination as defined in claim 4 wherein the duct is inclined by 30°-60°.

7. A combination as defined in claim 3 wherein a guide member is provided at the second supplied air outlet from the ventilator unit and the supplied air outlet from the air conditioner for ensuring smooth combination of the supply air.

8. A combination as defined in claim 7, wherein the guide member is secured on the ventilator unit.

9. A combination as defined in claim 7, wherein the guide member is secured on the air conditioner unit.

10. A combination as defined in claim 1 wherein mixture of the supplied air from the ventilator unit and from the air conditioner unit is performed exteriorly of the air conditioner unit.

11. A combination as defined in claim 1 wherein mixture of the supplied air is performed within the air conditioner unit.

* * * * *